Jan. 14, 1958     J. K. MERTZWEILLER ET AL     2,820,067
PREPARATION OF HIGH MOLECULAR WEIGHT ALCOHOLS
Filed Dec. 30, 1953
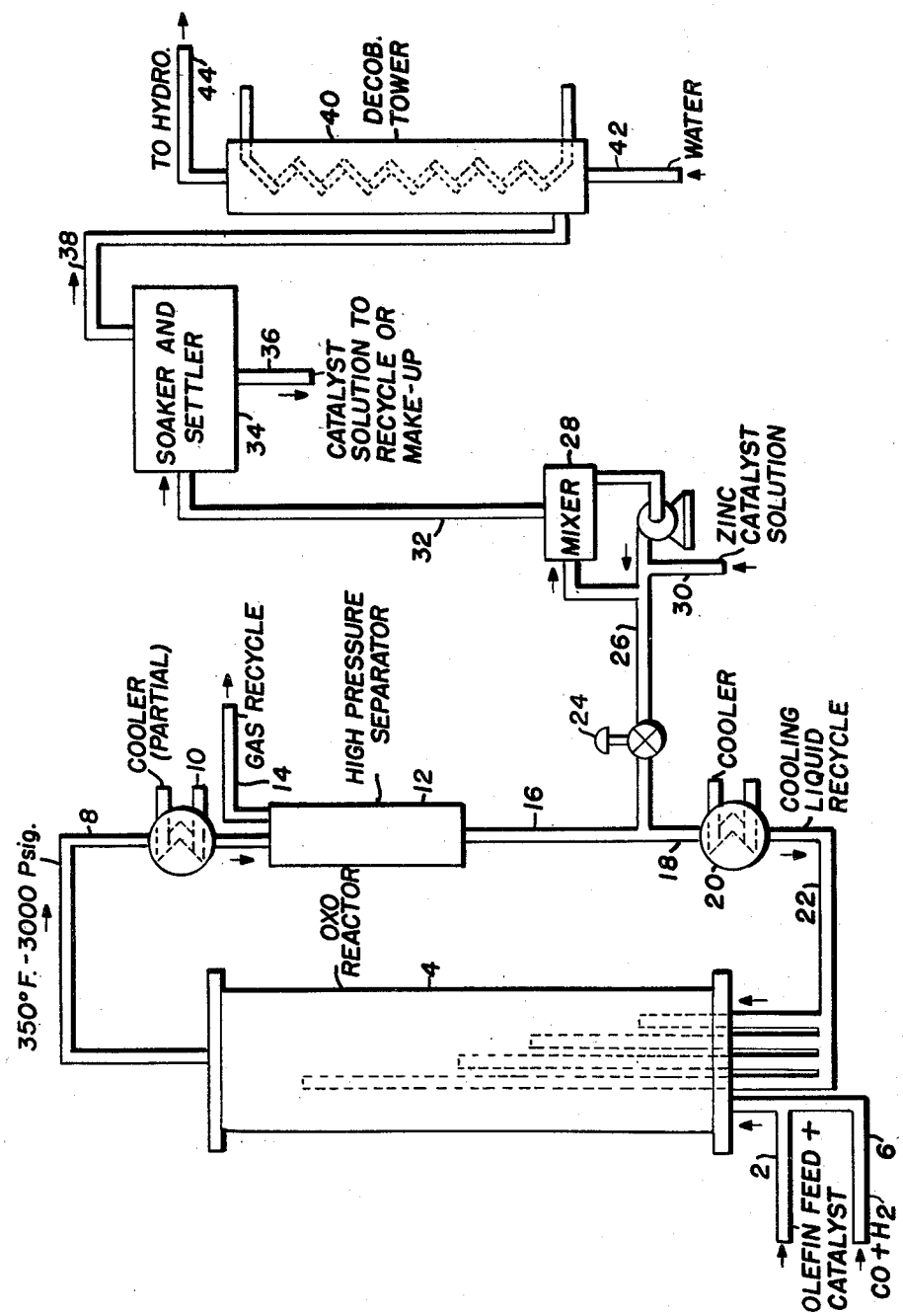
Joseph K. Mertzweiller
Neville L. Cull
Edward A. McCracken
Inventors
By R. W. Nagel    Attorney

United States Patent Office 2,820,067
Patented Jan. 14, 1958

---

2,820,067

PREPARATION OF HIGH MOLECULAR WEIGHT ALCOHOLS

Joseph K. Mertzweiller, Baton Rouge, Neville L. Cull, Baker, and Edward A. McCracken, Baton Rouge, La., assignors to Esso Research and Engineering Company, a corporation of Delaware Application December 30, 1953, Serial No. 401,234

9 Claims. (Cl. 260—638)

The present invention relates to the preparation of oxygenated organic compounds from olefins by reacting the latter with CO and $H_2$ in the presence of carbonylation catalysts. More specifically, the present invention relates to the preparation of high molecular weight alcohols from low molecular weight olefins by a novel modification of the aldehyde synthesis, or carbonylation reaction.

The synthesis of primary alcohols from olefins by treating the latter with CO and $H_2$ in the presence of a carbonylation or hydroformylation catalyst, particularly cobalt, is well known in the art. In the first stage the olefinic material, catalyst and $H_2$ and CO are reacted at elevated pressures and temperatures to give a product consisting essentially of aldehydes containing one more carbon atom than the olefin. This mixture, which contains dissolved in it salts and carbonyls of the catalyst, is treated in a second stage to cause removal of the metal compounds from the aldehyde product. Thereafter, the catalyst-free aldehyde product is generally hydrogenated to the corresponding alcohol, having in turn one more carbon atom than the olefin from which it is derived.

This carbonylation reaction provides a particularly attractive method for preparing valuable primary alcohols which find large markets particularly as intermediates for plasticizers, detergents, solvents and lubricants. Amenable to the reaction, to a greater or less extent, are most organic compounds having olefinic unsaturation, such as olefinic hydrocarbons, oxygenated compounds, and olefin polymers.

The catalyst in the first stage may be added as the olefin-soluble salt of cobalt, such as cobalt oleate or naphthenate. Also, aqueous solutions of cobalt compounds, or slurries of oil-insoluble forms of cobalt may be employed. Inasmuch as the active catalyst is probably cobalt hydrocarbonyl, most forms and compounds of the element may be employed, for they are converted into the active catalyst in the course of the reaction.

The synthesis gas mixture fed to the first stage may consist of an $H_2/CO$ ratio of 4 to 1 to 1 to 4, preferably 1/1. Reaction conditions in the first, or aldehyde synthesis stage, vary somewhat with the nature of the olefin feed and form of catalyst; generally the reaction is conducted at about 2000–4500 p. s. i. g., preferably 2500–3500 p. s. i. g. and at a temperature of about 250–375° F.

Following the carbonylation stage the aldehyde product, containing in solution considerable amounts of dissolved catalyst, is generally treated at elevated temperatures in the presence of a gas or vapor, such as $H_2$ or steam, or preferably liquid water, to decompose the carbonyl to an oil-insoluble form of cobalt, and thereafter the aldehyde product, freed of suspended catalyst, is hydrogenated to alcohol in the presence of conventional hydrogenation catalyst.

Useful as this process is for the preparation of alcohols, the technique is subject to several limitations which severely affect its utility for certain purposes. First and foremost is the fact that, though the reaction is rapid and yields are high with relatively low molecular olefins, the reaction rates and yields drop rapidly as the molecular weight increases. Though this effect is noticeable even in straight chain olefins, it becomes particularly pronounced when it is desired to carbonylate highly branch chained molecules, such as those formed by acid polymerizing of low molecular weight olefins. Thus the yield of $C_{16}$ alcohol prepared by subjecting a $C_{15}$ propylene polymerizate to the carbonylation reaction is substantially smaller than that obtained by carbonylating the $C_{12}$ fraction, which in turn is smaller than the $C_9$, etc. The monomer carbonylates extremely rapidly. This follows from steric considerations.

A second limitation of the carbonylation process for the production of high molecular weight alcohol lies in the unavailability of sufficient quantities of feed stocks. Again, when propylene is polymerized with itself and with butylenes under conventional acid polymerization conditions, the yields of polymer drop off rapidly after reaching a peak with the $C_9$ olefin, i. e., the propylene trimer and with increasing molecular weight, the polymer yields become too small to afford a commercially feasible operation for preparing higher molecular weight alcohols, such as $C_{16}$ and higher. Olefins may also be prepared by such processes as wax cracking, but this is a costly process and the products, being straight chained, do not lend themselves to uses where a more branched material is desirable.

It is, therefore, the principal purpose of the present invention to set forth a process for producing primary alcohols in relatively high molecular weight in good yields by the alcohol synthesis, or "Oxo" reaction.

It is also a purpose of the present invention to prepare, by a modification of the carbonylation reaction, good yields of alcohols from olefins which are readily available in commercial amounts.

A still further object of the present invention is to set forth a novel process for converting aldehydes to alcohols of higher molecular weight.

Other and further objects and purposes of the present invention will become more clear and apparent hereinafter.

It has now been found that when the aldehyde product produced in the first stage of the carbonylation process is treated at low pressures with certain salts and compounds of zinc, at elevated temperatures for an extended period of time there is obtained, after hydrogenation, high yields of a primary alcohol product having $2n+2$ carbon atoms when an olefin having $n$ carbon atoms is passed to the carbonylation stage. Thus, when a $C_9$ olefin is converted to the aldehyde and the latter treated in accordance with the invention, a $C_{20}$ primary saturated alcohol product is recovered in good yields. $C_{19}$ olefins are a rarity, and it is readily apparent that by this process readily available olefin feeds such as heptene, nonene, and dodecylene, may be converted to high molecular weight alcohols which are not available from high molecular weight olefins. The best results are obtained when zinc metal or zinc compounds are employed. High yields of both the monomeric and dimeric alcohols are recovered. In contrast to those processes wherein aldehydes are treated with aldolizing agents, no significant amounts of glycols are produced.

In accordance with the present invention, the first stage aldehyde product, preferably prior to decobalting, is mixed with 0.05–5 weight percent of a salt or compound of zinc. The salt may be dissolved in water, hydrocarbon, or oxygenated products. After mixing, the mixture containing the dimerization catalyst is passed to a soaking and settling vessel in which temperatures are maintained in the range of about 200° to 450° F., pressures of atm. to 1000 p. s. i. g., and holding times of 2–48 hours. If desired, the soaking vessel may be packed with mossy metal or metal turnings, such as zinc, in which case the mixing equipment may be eliminated.

An important advantage of this process is the fact that the cobalt catalyst is removed and recovered more readily. Also, as will be shown below, the reaction modifier is more active in the presence of dissolved cobalt carbonyl than when it is added to aldehydes from which cobalt has been removed by prior decobalting. The heat soaking greatly depletes the cobalt content of the aldehyde and a cobalt-rich aqueous phase can be removed from the soaker, if an aqueous solution of the reaction modifier is employed. The small amount of residual cobalt catalyst may then be removed in conventional decobalting equipment, but of much smaller capacity than hitherto necessary.

The present invention and its application will best be understood from the more detailed description hereinafter, wherein reference will be had to the accompanying drawing, which is a schematic representation of a system suitable for carrying out a preferred embodiment of the invention.

Referring now to the drawing, an olefin, preferably one having less than 15 carbon atoms, is passed through line 2 to the bottom of primary reactor 4. Suitable catalyst, such as cobalt oleate, may be dissolved therein to the extent of 0.1–0.5% by weight, based on cobalt. Reactor 4 is a high pressure vessel which is preferably packed with non-catalytic material, such as ceramic rings and is preferably divided into discrete zones separated by support grids.

A stream of synthesis gas comprising $H_2$ and $CO$ is passed into reactor 4 via line 6. Reaction conditions in the carbonylation zone comprise temperatures preferably in the range of about 300–375° F. and pressures of about 2500–3500 p. s. i. g., and a normal residence time of 1–3 hours.

Liquid aldehyde product, as well as secondary reaction products, containing catalyst and gases in solution are withdrawn upwardly through line 8 and passed through cooler 10 to high pressure gas-liquid separator 12 where unreacted gases are withdrawn overhead through line 14 for recycle. Liquid carbonylation product, the aldehyde content of which contains essentially one more carbon atom than the olefin feed admitted through line 2 and which liquid product contains in solution appreciable concentrations of cobalt compounds, such as the hydrocarbonyl, is withdrawn from separator 12 via line 16. A portion of this stream is recycled to reactor 4 via line 18, cooler 20 and line 22, to aid in cooling and maintenance of temperature control of the primary carbonylation stage.

The balance of the primary reaction product not recycled to reactor 2 is withdrawn through pressure release valve 24 and passed via line 26 to mixer 28. To the mixer there is supplied, through line 30, a solution of zinc salt, either aqueous, hydrocarbon or oxygenated solvent being operable. About 0.05–5% by weight of zinc salt, such as zinc acetate, may be employed. After mixing, the material is passed to a combination soaking and settling vessel 34 via line 32. Within 34 a temperature of about 200 to 450° F. and pressures of about atm. to 1000 p. s. i. g. are maintained. Soaking time at these conditions may be from about 2 to about 48 hours.

In the modification wherein an aqueous dimerizing agent is used, an aqueous stream is withdrawn downwardly from soaker 34 through line 36. This stream, containing both zinc and cobalt, may be recycled or used as make-up.

The reaction product, now containing substantial quantities of both the monomeric and dimeric aldehyde and alcohol product, and still containing some cobalt compounds, is passed to a decobalter vessel 40, wherein the mixture is treated with hot water or steam or vapor to decompose and remove inorganic materials, including compounds of cobalt and zinc. Because of the pretreatment at soaking conditions, equipment smaller than conventional may be employed.

The decobalted material is thereafter passed to a hydrogenation zone (not shown) where, under conventional hydrogenation conditions and known catalyst, conversion of aldehydes to alcohols is completed, and the resulting products, consisting essentially of the alcohol having $n+1$ and the alcohol having $2n+2$ carbon atoms resulting from an olefin having $n$ carbon atoms, are distilled and recovered.

The process of the present invention may be subject to many modifications, without departing from its spirit. Thus, aldehydes from other sources than those derived from the carbonylation reaction may be treated in accordance with the invention, though the latter has its highest utility when the aldehyde is treated in the presence of dissolved cobalt carbonyl. Also, it may be desirable to add at least a portion of the reaction modifier directly to the first, or carbonylation stage. In that case, the effluent is thermally treated in accordance with the present invention, with or without further addition of reaction modifier. Though the reaction modifier is effective when added to this stage, the normal residence time in a continuous operation is not always sufficient to give the highest yield of the dimer alcohol.

The invention may be further illustrated with the following specific examples.

*Example I*

An octyl aldehyde product of 90% purity prepared by oxonating a heptene fraction and distilling the aldehyde was treated with zinc at elevated temperatures under conditions set forth below. The reaction was carried out in autoclaves using nitrogen gas as an inert blanket.

| Catalyst | Zinc oleate | Zn acetate | Zn acetate | Zinc alumina spinel |
|---|---|---|---|---|
| Concentration, wt. percent | 2.8 | 5 | 5 | 10 |
| Hours heat treated | 6 | 6 | 12 | 6 |
| Temp., ° F | 350 | 350 | 300 | 350 |
| Yield, wt. percent: | | | | |
| $C_8$ alcohol | 44.5 | 41.0 | 46.5 | 68.8 |
| $C_{16}$ alcohol | 33.5 | 37.0 | 33.7 | 13.6 |
| Bottoms | 17.7 | 4.4 | 16.2 | 12.8 |
| No $C_{16}$ glycols were formed | | | | |

These data clearly show the high yields of higher boiling alcohols to be obtained in accordance with the process of the invention.

*Example II*

This example points up the beneficial results obtainable when the heat-treating and soaking step is included, but the reaction modifier itself is added directly to the aldehyde synthesis reactor. In the example below, zinc acetate (0.2%) was added to and was present during the oxonation reaction with heptene. Products were withdrawn at atmospheric pressure from the oxonation reactor and heat-soaked in stainless steel pressure bottles. The products after soaking were greatly depleted in cobalt content, and small amounts of residual catalyst removed by extracting with aqueous acetic acid. The product was then hydrogenated in autoclaves over nickel catalyst, and $C_8$ and $C_{16}$ alcohols removed by distillation.

| Heat soaking, hours at 210° F | None | 24 | 48 |
|---|---|---|---|
| Yield, weight percent: | | | |
| $C_8$ alcohol | 49.3 | 38.6 | 34.4 |
| $C_{16}$ alcohol | 18.8 | 31.5 | 31.5 |
| Bottoms | 6.1 | 8.3 | 11.0 |

*Example III*

A study was made of the effect of heat soaking $C_8$ oxo product with zinc salts in an effort to increase the yield of dimer alcohol. The best results indicate that at about 0.1% zinc ion concentration, heat soaking the oxo product for 12 hours at 400° F. or with 0.2% zinc at 300° F., gave about 16 wt. percent $C_{16}$ alcohol. In general, temperatures higher than 400° F. and zinc concentrations in excess of 0.2 wt. percent tend to favor high bottoms yields. Heat soaking the undecobalted oxo product shows a definite advantage over heat soaking decobalted oxo product with respect to amount of $C_{16}$ alcohol formed. These data are shown in the following tables:

The product from the oxo reactor before decobalting was heat soaked with zinc salts under conditions indicated as follows:

| Run No. | A | B | C | D | E |
|---|---|---|---|---|---|
| Catalyst | (¹) | (¹) | (¹) | (¹) | (¹) |
| Wt. percent zinc | 0.1 | 0.1 | 0.1 | 0.2 | None |
| Feed | (²) | (²) | (²) | (²) | (²) |
| Temperature | 300 | 400 | 500 | 300 | 300 |
| Nitrogen pressure, p.s.i.g | 500 | 500 | 500 | 500 | 500 |
| Time heat treated, hours | 12 | 12 | 12 | 12 | 12 |
| Wt. percent principal products: ³ | | | | | |
| Hydrocarbon | 16.1 | 16.5 | 16.7 | 17.8 | 14.4 |
| $C_8$ alcohol | 54.9 | 51.6 | 45.2 | 48.4 | 61.0 |
| Intermediate cut | 7.2 | 2.7 | 13.5 | 5.5 | 6.4 |
| $C_{16}$ alcohol | 9.6 | 15.7 | 5.8 | 15.9 | 8.0 |
| Bottoms | 12.2 | 13.5 | 19.4 | 13.9 | 10.2 |

¹ Zinc oleate.
² Undecobalted oxo product.
³ Based on distillation of heat treated oxo product hydrogenated in autoclave over reduced nickel catalyst.

Carbonyl numbers on the feed indicate about 42% $C_8$ aldehyde so that a wt. percent yield of $C_{16}$ alcohol of 16% is very good. Data indicate optimum yield:

(1) At 0.1% Zn and 400° F.
(2) At 0.2% Zn and 300° F.

Temperatures of 500° F. are too severe and result in
(1) Increased bottom yields.
(2) Increased intermediate cut yields—indicative of esters.

It will be noted that although heat soaking the oxo feed prior to decobalting results in some production of $C_{16}$ alcohol, it is only half of the yield obtainable with added zinc salts.

*Example IV*

Decobalted oxo product was heat soaked with zinc salts under the conditions indicated below:

| Run No. | F | G | H |
|---|---|---|---|
| Catalyst | (¹) | (¹) | (¹) |
| Wt. percent zinc | 0.2 | 0.5 | 0.0 |
| Feed | (²) | (²) | (²) |
| Temperature, ° F | 350 | 350 | 350 |
| Nitrogen, p.s.i.g | 500 | 500 | 500 |
| Time heat treated, hours | 12 | 12 | 12 |
| Wt. percent principal products: ³ | | | |
| Hydrocarbon | 14.4 | 12.5 | 12.2 |
| $C_8$ alcohol | 53.7 | 47.9 | 72.6 |
| Intermediate cut | 5.7 | 5.5 | 4.5 |
| $C_{16}$ alcohol | 10.6 | 12.5 | 2.9 |
| Bottoms | 15.1 | 21.7 | 8.1 |

¹ Zinc oleate.
² Decobalted oxo product.
³ Based on distillation of heat treated oxo product hydrogenated in autoclave over reduced nickel catalyst.

It will be noted that heat treating the decobalted product with zinc oleate results in an increase in $C_{16}$ alcohol yield from 3% to 11–12%. It will also be noted that this increase is not as great as was obtained on heat treating the oxo product before decobalting.

It will be noted also that in Examples III and IV the feed used was oxo product taken from a commercial oxo unit. Use of this feed per se without any further processing such as distillation, for example, constitutes a definite economic advantage over use of pure aldehydes.

What is claimed is:

1. In a process wherein olefins having $n$ carbon atoms in the molecule are converted to an oxygenated reaction product comprising aldehydes by reaction with hydrogen, carbon monoxide and a cobalt carbonylation catalyst at elevated temperatures and pressures, and said reaction product converted to an alcoholic product, the improvement which comprises heating said oxygenated reaction product with a zinc comprising material for 2 to 48 hours at a temperature of from about 200°–450° F., hydrogenating said treated product, and recovering a product comprising monohydric primary alcohols having $2n+2$ carbon atoms.

2. The process of claim 1 wherein said material is added to said oxygenated reaction product prior to removal of cobalt carbonyl therefrom.

3. The process of claim 1 wherein said material is added to the extent 0.05–5% by weight of aldehyde.

4. In a process wherein olefins having $n$ carbon atoms in the molecule are converted to an oxygenated reaction product comprising aldehydes by reaction with $H_2$, $CO$, and a cobalt catalyst at elevated temperatures and pressures in an oxonation zone, and said oxygenated reaction product containing cobalt carbonyl in solution thereafter freed of cobalt and converted to an alcohol product, the improvement of producing high yields of an alcohol product containing $2n+2$ carbon atoms which comprises subjecting said oxygenated reaction product to a thermal treatment in a soaking zone for 2–48 hours at 200–450° F. in the presence of from 0.05–5% of a zinc comprising material.

5. The process of claim 4 wherein said material is to said oxonation zone.

6. The process of claim 4 wherein said material is added to said soaking zone.

7. The process of claim 4 wherein said thermal treatment is carried out prior to removal of cobalt carbonyl from said oxygenated reaction product.

8. The process of claim 4 wherein said material is a zinc salt.

9. The process of claim 8 wherein said salt is zinc acetate.

References Cited in the file of this patent
FOREIGN PATENTS 644,665     Great Britain             Oct. 18, 1950

OTHER REFERENCES

Wender et al.: Bureau of Mines Report of Investigations 4270, June 1948, pp. 1, 4 to 6, 9, 10 and 11.

Karrer: Organic Chemistry, Elsevier, N. Y., 1950; pp. 164, 170.